United States Patent
Rezai et al.

(10) Patent No.: US 12,453,858 B2
(45) Date of Patent: Oct. 28, 2025

(54) NEUROMODULATORY METHODS FOR IMPROVING ADDICTION USING MULTI-DIMENSIONAL FEEDBACK

(71) Applicant: West Virginia University Board of Governors on behalf of West Virginia University, Morgantown, WV (US)

(72) Inventors: Ali Rezai, Morgantown, WV (US); Victor Finomore, Morgantown, WV (US); James Mahoney, Morgantown, WV (US); Marc Haut, Morgantown, WV (US)

(73) Assignee: WEST VIRGINIA UNIVERSITY BOARD OF GOVERNORS ON BEHALF OF WEST VIRGINIA UNIVERSITY, Morgantown, WV (US)

(*) Notice: Subject to any disclaimer, the term of this patent is extended or adjusted under 35 U.S.C. 154(b) by 1276 days.

(21) Appl. No.: 17/110,152

(22) Filed: Dec. 2, 2020

(65) Prior Publication Data

US 2021/0162216 A1 Jun. 3, 2021

Related U.S. Application Data

(60) Provisional application No. 62/942,349, filed on Dec. 2, 2019, provisional application No. 62/942,343, filed on Dec. 2, 2019, provisional application No. 62/942,328, filed on Dec. 2, 2019.

(51) Int. Cl.
*A61N 1/36* (2006.01)
*A61N 2/00* (2006.01)
*A61N 7/00* (2006.01)

(52) U.S. Cl.
CPC ....... *A61N 1/36089* (2013.01); *A61N 1/3615* (2013.01); *A61N 1/36175* (2013.01); *A61N 2/006* (2013.01); *A61N 7/00* (2013.01); *A61N 2007/0026* (2013.01)

(58) Field of Classification Search
CPC .. A61N 2007/0026; A61N 7/00; A61N 2/006; A61N 1/36175; A61N 1/3615; A61N 1/36089
See application file for complete search history.

(56) References Cited

U.S. PATENT DOCUMENTS

| | | |
|---|---|---|
| 10,035,027 B2 | 7/2018 | Deisseroth et al. |
| 10,232,115 B2 | 3/2019 | Osorio |
| 10,383,571 B1 | 8/2019 | Pulliam et al. |

(Continued)

FOREIGN PATENT DOCUMENTS

| | | |
|---|---|---|
| WO | 2015/192189 A1 | 12/2015 |
| WO | 2020/198686 A1 | 10/2020 |
| WO | 2023/278199 A1 | 1/2023 |

*Primary Examiner* — Samuel G Gilbert
(74) *Attorney, Agent, or Firm* — Tarolli, Sundheim, Covell &Tummino LLP

(57) ABSTRACT

Methods of improving addiction in a patient in need thereof are provided. Methods include using focused ultrasound, deep brain stimulation and/or transcranial magnetic stimulation and multi-dimensional monitoring of the patient to determine whether the focused ultrasound, deep brain stimulation, and/or transcranial magnetic stimulation improves the patient's addiction. Based on this determination, the focused ultrasound, deep brain stimulation, and/or transcranial magnetic stimulation can be adjusted to improve the patient's addiction.

20 Claims, 4 Drawing Sheets

(56) References Cited

U.S. PATENT DOCUMENTS

| | | | |
|---|---|---|---|
| 2004/0049134 A1 | 3/2004 | Tosaya et al. | |
| 2005/0020945 A1 | 1/2005 | Tosaya et al. | |
| 2009/0112133 A1 | 4/2009 | Deisseroth et al. | |
| 2011/0112394 A1 | 5/2011 | Mishelevich | |
| 2011/0178442 A1 | 7/2011 | Mishelevich | |
| 2012/0245493 A1 | 9/2012 | Mishelevich | |
| 2012/0283502 A1 | 11/2012 | Mishelevich et al. | |
| 2012/0283604 A1 | 11/2012 | Mishelevich | |
| 2012/0296241 A1 | 11/2012 | Mishelevich | |
| 2013/0079682 A1 | 3/2013 | Mischelevich | |
| 2013/0144192 A1 | 6/2013 | Mischelevich et al. | |
| 2013/0184728 A1 | 7/2013 | Mishelevich | |
| 2013/0197401 A1 | 8/2013 | Sato et al. | |
| 2013/0261506 A1 | 10/2013 | Mishelevich | |
| 2013/0281890 A1 | 10/2013 | Mishelevich | |
| 2014/0058292 A1* | 2/2014 | Alford | A61B 5/0036 601/2 |
| 2014/0094720 A1 | 4/2014 | Tyler | |
| 2014/0194726 A1 | 7/2014 | Mishelevich et al. | |
| 2015/0182756 A1 | 7/2015 | Peyman | |
| 2016/0001096 A1* | 1/2016 | Mishelevich | A61B 90/37 601/2 |
| 2016/0243381 A1 | 8/2016 | Alford et al. | |
| 2017/0246481 A1 | 8/2017 | Mishelevich | |
| 2018/0126191 A1 | 5/2018 | Loike et al. | |
| 2018/0140871 A1 | 5/2018 | Konofagou et al. | |
| 2018/0214716 A1 | 8/2018 | Goetz et al. | |
| 2020/0289855 A1 | 9/2020 | Shimokawa et al. | |
| 2021/0138276 A9 | 5/2021 | Kabrams et al. | |
| 2022/0168445 A1 | 6/2022 | Kaplitt et al. | |

\* cited by examiner

NEUROMODULATORY METHODS FOR IMPROVING ADDICTION USING MULTI-DIMENSIONAL FEEDBACK

CROSS REFERENCE TO RELATED APPLICATIONS

This application claims priority to U.S. Provisional Application No. 62/942,343; U.S. Provisional Application No. 62/942,328; and U.S. Provisional Application No. 62/942,349, all of which were filed on Dec. 2, 2019 and all of which are incorporated by reference in their entirety.

GOVERNMENT SUPPORT CLAUSE

This invention was made with government support under grant number DA047714 awarded by the National Institutes of Health. The government has certain rights in the invention.

TECHNICAL FIELD

The present disclosure relates to methods of improving addiction using focused ultrasound, deep brain stimulation, and/or transcranial magnetic stimulation and by measuring the patient's physiological, behavioral, psychosocial and cognitive state in response to the focused ultrasound, deep brain stimulation and/or transcranial magnetic stimulation.

BACKGROUND

Nationally, it was estimated that 10.5 million people in the United States (U.S.) misused opioids in 2019. Opioid overdoses in the U.S. have quadrupled since 2000, contributing to over 46,800 overdose deaths in 2018 and accounting for nearly 70% of all drug overdose deaths. The toll of this opioid epidemic goes well beyond overdose survivals and deaths. For example, there has been an upsurge of intravenous drug use resulting in significant increases in infectious diseases. Rates of hepatitis C (HCV) have steadily increased over the past decade. Future generations may be affected as the number of pregnant women with HCV has doubled in recent years and this virus may be transmitted by a pregnant woman to her infant. The morbidity and mortality secondary to the opioid epidemic is currently a significant public health problem.

Although medication-assisted treatment (MAT) has been effective in improving outcomes (abstinence and harm reduction), current opioid use disorder (OUD) treatment is not ideal as approximately 50% of those seeking treatment relapse to opioids and/or other substances. In a multisite, randomized trial, it was reported that the rate of unsuccessful outcomes following MAT (using buprenorphine-naloxone) exceeded 90% and, even when individuals were stabilized on MAT over 12 weeks, the rate of successful outcomes was less than 50%. It has also been reported that many patients never even start the MAT because of withdrawal symptoms, and those who start often discontinue. In addition, patients following MAT can have high relapse rates. Furthermore, many patients with OUD are also using or misusing other addictive substances such as, for example, benzodiazepines, cannabis, or cocaine.

Given the current opioid epidemic, the high rate of relapse and overdose deaths, and the additive impact of polysubstance use, it is important to identify new modalities for treating OUD. While we are clearly in the midst of an opioid epidemic, there is also a detrimental impact of other illicit substance use co-occurring in those with OUD. Thus polysubstance use is also a concern suggesting that comprehensive substance use disorder (SUD) prevention and treatment strategies are needed.

SUMMARY

A multi-dimensional feedback approach to improve, monitor or otherwise assess a patient's addiction is provided herein.

In an aspect, a method of improving addiction to an addictive behavior or addictive chemical substance in a patient in need thereof is provided. A method comprises obtaining a measurement of baseline values of one or more combinations of a physiological, a cognitive, a psychosocial, and a behavioral parameter of the patient. The method further includes applying an initial focused ultrasound signal, an initial deep brain stimulation signal and/or an initial transcranial magnetic stimulation signal to a neural target site of the patient and obtaining a subsequent measurement of resultant values of the one or more combinations of the physiological, the cognitive, the psychosocial, and the behavioral parameter of the patient during or after application of the initial focused ultrasound signal, the initial deep brain stimulation signal and/or the initial transcranial magnetic stimulation signal. The method further includes obtaining a comparison of the resultant values to the baseline values to determine if the patient's addiction has improved and applying or adjusting application of one or more subsequent focused ultrasound signals, deep brain stimulation signals, and/or transcranial magnetic stimulation signals to the neural target site upon a determination that the patient's addiction has not improved to improve the patient's addiction.

In another aspect, a method of monitoring addiction to an addictive behavior or addictive chemical substance in a patient is provided. A method comprises obtaining a measurement of baseline values of one or more combinations of a physiological, a cognitive, psychosocial, and a behavioral parameter of the patient. The method further includes applying an initial focused ultrasound signal, an initial deep brain stimulation signal, and/or an initial transcranial magnetic stimulation signal to a neural target site of the patient and obtaining a subsequent measurement of resultant values of the one or more combinations of the physiological, the cognitive, the psychosocial, and the behavioral parameter of the patient during or after application of the initial focused ultrasound signal, the initial deep brain stimulation signal, and/or the initial transcranial magnetic stimulation signal. The method further comprises obtaining a comparison of the resultant values to the baseline values and monitoring the patient's addiction based on the comparison of the resultant values to the baseline values.

In another aspect, a method of notifying a patient or third party of a patient's addiction to an addictive behavior or addictive chemical substance is provided. A method comprises obtaining a measurement of baseline values of one or more combinations of a physiological, a cognitive, a psychosocial, and a behavioral parameter of the patient. The method further includes applying an initial focused ultrasound signal, an initial deep brain stimulation signal, and/or an initial transcranial stimulation signal to a neural target site of the patient. The method further comprises obtaining a subsequent measurement of resultant values of the one or more combinations of the physiological, the cognitive, the psychosocial, and the behavioral parameter of the patient during or after application of the initial focused ultrasound signal, the initial deep brain stimulation signal, and/or the initial transcranial magnetic stimulation signal. The method further includes obtaining a comparison of the resultant values to the baseline values to determine if the patient's addiction has improved and applying or adjusting application of one or more subsequent focused ultrasound signals, deep brain stimulation signals, and/or transcranial magnetic stimulation signals to the neural target site upon a determination that the patient's addiction has not improved. The method further comprises notifying the patient or third party upon the determination that the patient's addiction has not improved.

In another aspect, a method of identifying a target neural site for applying a focused ultrasound signal, a deep brain stimulation signal, and/or a transcranial magnetic stimulation signal to a patient suffering from addiction to an addictive behavior or addictive chemical substance is provided. A method comprises obtaining a measurement of baseline values of one or more combinations of a physiological, a cognitive, a psychosocial, and a behavioral parameter of the patient. The method further includes applying an initial focused ultrasound signal, an initial deep brain stimulation signal, and/or an initial transcranial magnetic stimulation signal to an initial neural site of the patient. The method further comprises obtaining a subsequent measurement of resultant values of the one or more combinations of the physiological, cognitive, psychosocial, and behavioral parameter of the patient during or after application of the initial focused ultrasound signal. The method further includes obtaining a comparison of the resultant values to the baseline values. The method additionally comprises determining if application of the initial focused ultrasound signal, the initial deep brain stimulation signal, and/or the initial transcranial magnetic stimulation signal improves the patient's addiction based on the comparison of the resultant values to the baseline values and identifying the initial neural site as the target neural site upon a determination of improvement of the patient's addiction.

In another aspect a method of treating a physiological, cognitive, psychosocial, or behavioral characteristic that contribute to one's addiction in a patient suffering from addiction to an addictive behavior or addictive chemical substance is provided. Such a method comprises obtaining a measurement of baseline values of the physiological, the cognitive, the psychosocial, or the behavioral characteristic of the patient. The method further includes applying an initial focused ultrasound signal, an initial deep brain stimulation signal, and/or an initial transcranial magnetic stimulation signal to an initial neural site of the patient. The method further comprises obtaining a subsequent measurement of resultant values of the physiological, cognitive, psychosocial, or behavioral characteristic of the patient during or after application of the initial focused ultrasound signal, the initial deep brain stimulation signal and/or the initial transcranial magnetic stimulation signal. The method further includes obtaining a comparison of the resultant values to the baseline values. The method additionally comprises determining if application of the initial focused ultrasound signal, the initial deep brain stimulation signal, and/or the initial transcranial magnetic stimulation signal improves the patient's physiological, cognitive, psychosocial, or behavioral characteristic based on the comparison of the resultant values to the baseline values. The method further comprises identifying the initial neural site as the target neural site upon a determination of improvement of the patient's physiological, cognitive, psychosocial, or behavioral characteristic. The method can further include applying a subsequent focused ultrasound signal, a subsequent deep brain stimulation signal, and/or a subsequent transcranial magnetic stimulation signal to the target neural site.

In another aspect, a method of selecting a patient suffering from addiction to an addictive behavior or addictive chemical substance for treatment for such addiction is provided. Such a method includes obtaining a measurement of baseline values of one or more combinations of a physiological, a cognitive, a psychosocial, and a behavioral parameter of the patient. The method further comprises determining threshold values for the one or more combinations of the physiological, cognitive, psychosocial, and behavioral parameters. The method further includes selecting a patient for therapy upon a determination that the baseline values are different from the threshold values. Once the patient is selected for the therapy, the method can further include applying an initial focused ultrasound signal, an initial deep brain stimulation signal, and/or an initial transcranial magnetic stimulation signal to the patient to improve the patient's addiction. Patients are selected that have quantifiable measurements of physiological, cognitive, psychosocial, and behavioral values at baseline to properly measure threshold differences.

DETAILED DESCRIPTION

Figure 1:
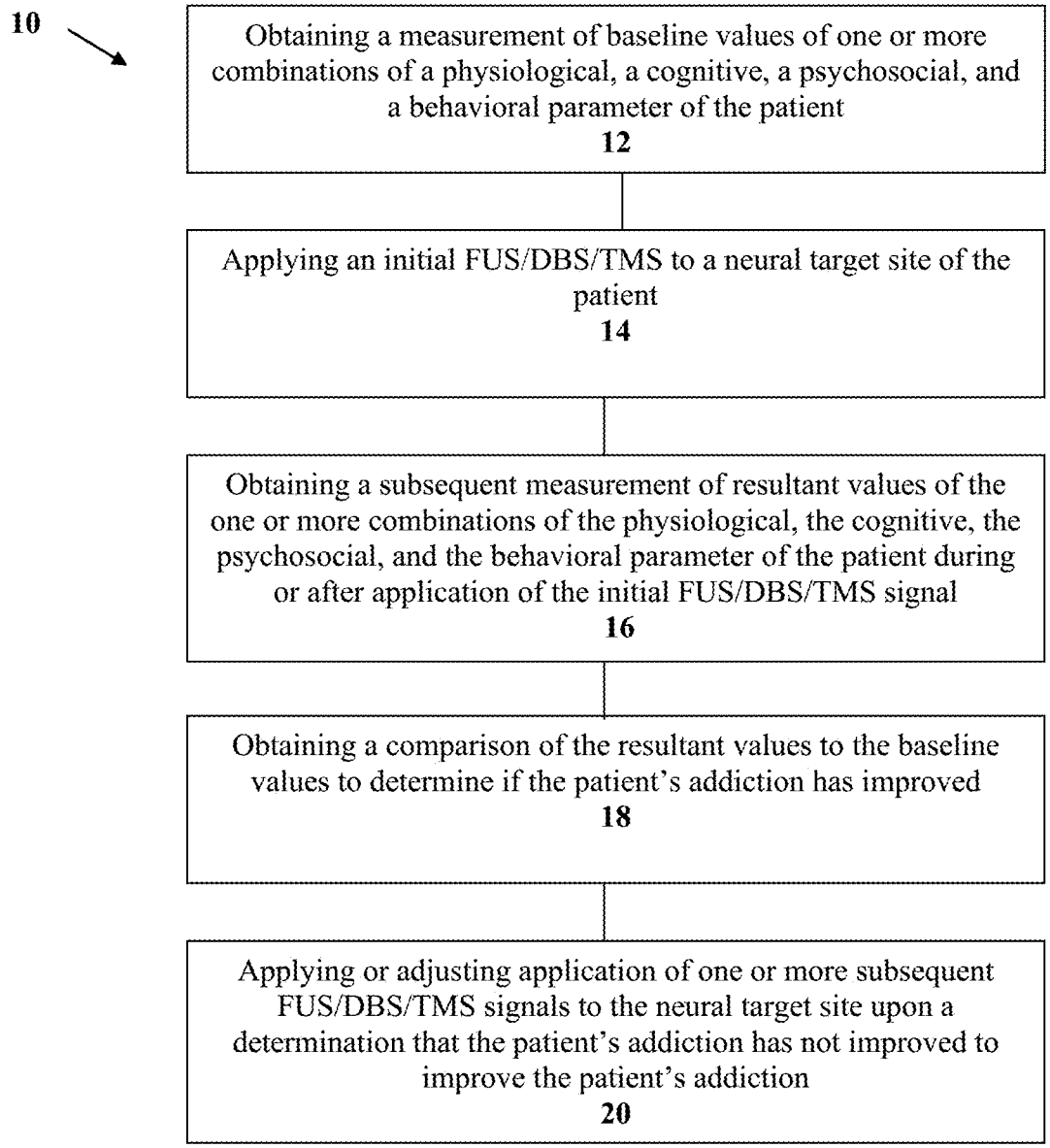
FIG. 1 is a flow diagram of exemplary steps of a method of improving addiction according to an aspect of the present disclosure.

As used herein with respect to a described element, the terms "a," "an," "the," "first," "another" include at least one or more of the described element including combinations thereof neither requiring nor excluding two or more such elements, unless otherwise indicated. Further, the terms "or" and "and" refer to "and/or" and combinations thereof unless otherwise indicated.

A "biological rhythm" is any chronobiological phenomenon that affects human beings, including but not limited to, circadian rhythms, ultradian rhythms, infradian rhythms, diurnal cycle, sleep/wake cycles, and patterns of life.

A "portable monitoring device," as used herein, refers to a device that is worn by, carried by, or implanted within a user that incorporates either or both of an input device and user interface for receiving input from the user and sensors for monitoring either a parameter relevant to monitoring addiction or a parameter that can be used to calculate or estimate such a parameter.

An "index", as used herein, is intended to cover composite statistics derived from a series of observations and used as an indicator or measure. An index can be an ordinal, continuous, or categorical value representing the observations and correlations, and should be read to encompass statistics traditionally referred to as "scores" as well as the more technical meaning of index.

The present disclosure relates to using a multi-dimensional feedback approach to improve a patient's addiction. For example, methods can include using ultrasound, such as focused ultrasound (FUS) therapy; deep brain stimulation (DBS), and/or transcranial magnetic stimulation (TMS) and one or more combinations of the patient's resultant physiological, cognitive, psychosocial, behavioral and responses as well as sensory responses (e.g. smell, touch, taste, vestibular, interoception, proprioception, vision, and hearing), motor, and autonomic responses. Such feedback can also be used with a clinical assessment and history to improve the patient's addiction to addictive behavior or to one or more addictive chemical substances. By improving addiction, the patient's addiction is less severe after FUS/DBS/TMS therapy than before FUS/DBS/TMS therapy. For example, the patient's addiction can be improved by reducing the risk factors associated with relapse such as by reducing the patient's substance craving. If craving is reduced, this can contribute to improvements in the patient's mood and anxiety as well as improvements in cognitive aspects such as executive function and impulse control. As such, improving addiction in a patient suffering from addiction includes improving physiological, cognitive, psychosocial, or behavioral characteristics that are the result of or at least partially cause the patient's addiction, such as, for example, anxiety or depression. The patient's addiction cycle can also be improved including use, misuse and addiction. Non-limiting examples of addiction to an addictive behavior include addiction to gambling, food, sex, shopping, sport and physical exercise, video gaming, social media use, pathological working, and compulsive criminal behavior, and combinations thereof. Non-limiting examples of addiction to an addictive chemical substance include addiction to nicotine, alcohol, heroin, opioids, cocaine, benzodiazepines, sedatives/hypnotics, cannabis, amphetamines, other psychoactive substances with abuse liability; and combinations thereof.

Physiological, cognitive, psychosocial, and behavioral parameters in addition to sensory responses from the patient can be used to provide various types of feedback including live feedback, preemptive feedback, prophylactic feedback, retroactive feedback individually or in combination. Such parameters can be used as feedback to create a patient-specific addiction profile by quantifying the functional state of an individual presenting with addiction. Such a patient-specific addiction profile can be used to determine whether a patient is a suitable candidate for neuromodulation (as opposed to current selection processes which rely on the relapse occurrence/rate of an addict); predict when a patient may engage in addictive behavior or consume an addictive substance or otherwise display a characteristic that places the patient at greater risk for consuming an addictive substance or engaging in addictive behavior; provide proactive/preemptive/prophylactic therapy based on predictive models that can predict when the patient will have cravings or increased anxiety (for example) that motivate him/her to consume an addictive substance or engage in addictive behavior; determine what type of neuromodulation is expected to be most effective for the particular patient; and determine which target site(s) to stimulate for the particular patients. As such, stimulation can be provided in advance prior to symptom onset to modulate a neural target region to prevent, reduce, minimize, stop craving, anxiety, depression and other manifestations of addiction.

With respect to target site selection and symptom specific targeting (e.g. sub-selecting individual features that contribute to addiction and treating those individual features), such parameters can be used as feedback to select target sites for neuromodulation for addiction including specific target sub-sites that may contribute, cause or be the result of specific addiction relevant physiological, cognitive, psychosocial, or behavioral characteristics, such as depression or anxiety (e.g. specific symptom targeting). In the context of DBS, such parameters can be used to hone in on specific sites within a general neural target site of the neural reward circuitry such as, for example, the shell vs. the core of the nucleus accumbens that give rise to the specific addiction relevant physiological, cognitive, psychosocial, or behavioral parameters. In the context of DBS, such feedback can also be used to determine which electrical contacts of an electrical lead, for example, should be activated. For example, in the context of the nucleus accumbens, in certain patients, activating the core vs. the shell or vice versa (both for DBS and FUS) may be effective in improving the patient's addiction. As such, feedback from physiological, cognitive, psychosocial, and behavioral parameters can be used to determine which electrode contacts to activate to stimulate the specific target sites within the area that the electrical lead encompasses. The same feedback can be used in the context of TMS. For example, with respect to TMS, specific regions of the cortex, such as the prefrontal cortex or even more specifically, the dorsofrontal cortex can be targeted based on the patient's addiction profile. Target sites can be further narrowed if the clinician wants to treat particular characteristics of addiction. For example, there are personality components to addiction, such as anxiety and depression. Such components can be targeted differently (e.g. different areas of the brain can be targeted) based on physiological, cognitive, psychosocial, and behavioral parameters in addition to sensory responses from the patient.

Methods as disclosed herein can involve measuring baseline physiological, cognitive, psychosocial, and behavioral parameter values and comparing these baseline values to the physiological, cognitive, psychosocial, and behavioral parameter values (also referred to herein as "resultant values") during or after a FUS/DBS/TMS therapy session or after each of multiple FUS/DBS/TMS therapy sessions. The baseline physiological, cognitive, psychosocial, and behavioral parameter values can also be compared to the physiological, cognitive, psychosocial, and behavioral parameter values prior to a FUS/DBS/TMS session or before each of a multiple FUS/DBS/TMS therapy session. The specific parameters that can be measured serve as feedback parameters or predictive/surrogate markers of the patient's risk of relapse, the patient's functional state, or the patient's risk of otherwise engaging in the addictive behavior or consuming the addictive substance to aid the clinician in monitoring the patient's status and condition and providing or adjusting therapy accordingly. As such, through the use of data analytics and machine learning approach one or more combinations of the physiological, cognitive, psychosocial, and behavioral parameter measurements can effectively gauge the patient's impulsivity, self-regulation, inhibition, decision making and other cognitive and behavioral functions related to abuse, dependence, addiction and/or relapse. These measurements can provide insight to the clinician when determining the patient's risk of engaging in addictive behavior or consuming an addictive chemical substance so that the clinician can preemptively provide intervening FUS/DBS/TMS therapy before the patient engages in such behavior or consumption.

Referring to FIG. 1, in an aspect, a method of improving addiction to an addictive behavior or addictive chemical substance in a patient in need thereof 10 can comprise obtaining a measurement of baseline values of one or more combinations of a physiological, a cognitive, a psychosocial, and a behavioral parameter of the patient 12. These baseline values, which can be taken at various time points before or during the administration of FUS/DBS/TMS, can be taken while the patient is under a standard of care for addiction as outlined, for example, by the American Society of Addiction Medicine (ASAM 2013). These baseline values can be taken at intake and/or during the course of medicated assisted, and/or behavioral treatment. Further, these baselines values can be taken in a clinical/laboratory setting prior to the patient receiving FUS/DBS/TMS therapy. After this initial assessment, method 10 can comprise applying an initial FUS/DBS/TMS signal to a neural target site of the patient 14. For example, the neural target site can be a site of the neural reward circuitry. Non-limiting examples of neural target sites include the nucleus accumbens (including the shell and core of the nucleus accumbens), internal capsule, the insula, the anterior cingulate cortex, the subthalamic nucleus, the striatum including the dorsal and ventral striatum, the prefrontal cortex including the dorsolateral and medial prefrontal cortex, the orbitofrontal cortex, hippocampus, amygdala, or combinations thereof. Non-limiting parameters of the initial FUS are Sonication dose, Power (0 W-150 W), Sonication Duration (e.g. 0 min-30 min 60), frequency direction, Repetition Time On/Off (e.g. 5 sec; 10 sec), Pulse Duration On/Off (e.g. 100 msec; 900 msec), continuous or burst, Energy/Minute (e.g. 0 J/min-290 J/min, and Frequency (e.g. 0.1-3 MHz), number of elements (e.g. 1-1024), and waveshape form. Non-limiting parameters of the initial DBS are frequency (e.g. ~1 Hz to 10,000 Hz), pulse width (e.g. ~5 microseconds to ~1000 microseconds), intensity (e.g. ~0.1 v or mA to ~30 v or mA, and waveform shape. Non-limiting parameters of the initial TMS are intensity (e.g. ~0 to ~200% resting motor threshold); frequency (e.g. ~0.01 Hz to ~30 Hz); type of stimulation (e.g. single, repetitive, and/or patterned); and duration (e.g. ~1 to ~90 min). The FUS/DBS/TMS signal can be applied unilaterally or bilaterally to the neural target site.

Method 10 can then comprise obtaining a subsequent measurement of resultant values of one or more combinations of physiological, cognitive, psychosocial, and behavioral parameters of the patient during or after application of the initial FUS/DBS/TMS signal 16. The subsequent physiological parameters can be measured in a clinical/laboratory setting or in a naturalistic, non-clinical setting such as when the patient is at home, work or other non-clinical setting. Such subsequent measurements can be taken numerous times after the FUS/DBS/TMS therapy and between multiple FUS/DBS/TMS therapy sessions and can be taken at random times or pre-determined times. In one example, at least some of the parameters can be measured periodically through the course of several days or weeks as to establish a time series of measurements representing a biological rhythm of the patient.

Method 10 further comprises obtaining a comparison of the resultant values to the baseline values to determine if the patient's addiction has improved 18. It will be appreciated that, in one example, the comparison can be performed using a machine learning system trained on data representing previous cases, such that a clinical parameter representing a risk level of relapsing for the patient can be determined according to a deviation of the patient from a baseline value. The one or more combinations of the physiological, cognitive, psychosocial, and behavioral parameters can provide feedback to the patient's clinician regarding the efficacy of the FUS/DBS/TMS therapy and can indicate the patient's risk level of relapsing or otherwise engaging in the addictive behavior or consuming the addictive chemical substance. By obtaining a comparison of the one or more combinations of the physiological, cognitive, psychosocial, and behavior parameters before and after FUS/DBS/TMS therapy, a clinician can tailor the patient's therapy moving forward. As such, method 10 can then comprise applying or adjusting application of one or more subsequent FUS/DBS/TMS signals to the neural target site upon a determination that the patient's addiction has not improved to improve the patient's addiction 20.

For example, adjusting application of one or more subsequent FUS/DBS/TMS signals if the patient's addiction has not improved can comprise modulating (including increasing or decreasing) the frequency, duration, intensity, dose, cumulative dose, or combinations thereof of the one or more subsequent FUS/DBS/TMS signals. Such subsequent FUS/DBS/TMS signals can be delivered over the course of multiple sessions. The number of sessions as well as the therapy parameters within each session can depend on the patient's physiological, cognitive, psychosocial, and behavioral parameter resultant values after each session or after multiple sessions. For example, if the patient's addiction has not improved and the patient was previously having FUS/TMS delivered for five minutes during a session, the patient can have the FUS/TMS delivered for twenty minutes during a subsequent session or if the patient was having FUS/TMS delivered every thirty days, the patient can have FUS/TMS subsequently delivered every two weeks. In the case, of DBS the stimulation parameters can be adjusted. Methods can also involve not applying or not adjusting FUS/DBS/TMS to the patient upon a determination that the patient's addiction has improved. For example, if the patient's addiction has improved based on the patient's physiological, cognitive, psychosocial, and behavioral parameter resultant values, the FUS/DBS/TMS parameters may not need adjustment and subsequent FUS/DBS/TMS sessions can serve primarily as maintenance sessions or the patient can stop receiving any subsequent FUS/DBS/TMS. Alternatively, if the patient's physiological, cognitive, psychosocial, and behavioral parameter resultant values indicate improvement of the patient's addiction, the frequency, duration, intensity or combinations thereof of subsequent FUS/DBS/TMS can be modified accordingly (including increasing or decreasing such parameters). The above scenarios are only exemplary and are provided to illustrate that the presence and type of change between the patient's baseline values and resultant values of one or more combinations of physiological, cognitive, psychosocial, and behavioral parameter measurements can influence whether FUS/DBS/TMS is delivered or if existing FUS/DBS/TMS application should be adjusted or terminated.

Further, the degree of the patient's physiological, cognitive, psychosocial, and behavioral measurement values during or after FUS/DBS/TMS can influence the parameters of initial or subsequent FUS/DBS/TMS therapy. For example, if the specific patient seeking therapy has a physiological, cognitive, psychosocial, or behavioral parameter measurement value during or after FUS/DBS/TMS that is outside the normal range than the average physiological, cognitive, or behavioral parameter measurement value of the same patient population (patients with the same addiction and/or same demographic features), the therapy can be more or less aggressive initially or subsequently (e.g. the duration, frequency or intensity of the FUS/DBS/TMS can be greater than that provided to patients of the same patient population). In other words, the severity or degree of the patient's resultant parameter measurements value during or after FUS can correlate to the degree or aggressiveness of the FUS/DBS/TMS therapy. The above scenarios are only exemplary and are provided to illustrate that the degree of change of the patient's physiological, cognitive, psychosocial, or behavioral parameter measurement values during and after FUS/DBS/TMS can influence the therapeutic parameters of initial and subsequent FUS/DBS/TMS therapy.

Table I provides non-limiting examples of physiological parameters that can be measured and exemplary tests, devices, and methods, to measure the physiological parameters.

work or other non-clinical setting. Different locations of the patient's reward circuitry could elicit different Different band frequencies, which correlate to different levels of efficacy, could Depending on which location of the reward circuitry is stimulated, The physiological parameters can be measured via wearable or implantable devices as well as self-reporting by the user via applications in a mobile device, which facilitates measuring these physiological parameters in a naturalistic, non-clinical setting. For example, a smart watch can be used to measure the patient's heart rate, heart rate variability, body temperature, blood oxygen saturation, movement, and sleep. These values can also be subject to a diurnal analysis to estimate variability and reviewed in view of expected changes due to biological rhythms, as well as deviations from an expected pattern of biological rhythms. For example, the biological rhythms can be detected as departures from this established pattern. Collecting data with such wearables allows the patient's risk level to be assessed in an environment (e.g. home or work) where the patient is more likely to relapse or otherwise engage in the addictive behavior or consume the addictive substance.

The cognitive parameters can be assessed by a battery of cognitive tests that measure, for example, executive function, planning, flexibility, response inhibition, impulsivity,

TABLE I

| Physiological Parameter | Exemplary Devices and Methods to Measure Physiological Parameters |
| --- | --- |
| Brain Activity | Electroencephalogram; Magnetic Resonance Imaging, including functional Magnetic Resonance Imaging (fMRI); Positron emission tomography (PET); single-photon emission computerized tomography (SPECT); Magnetoencephalography (MEG); and other brain imaging modalities looking at electrical, blood flow, neurotransmitter, and metabolic function; chemical signals received from an implanted device and chemical signals from cerebrospinal fluid; electrical activity from EEG; local field potentials recorded from neural target site(s) of neural reward circuitry from DBS or other brain implants such as beta, gamma, and alpha band frequency and other frequency activity recorded from the brain. |
| Heart rate | Electrocardiogram and Photoplethysmogram |
| Heart rate variability | Electrocardiogram, Photoplethysmogram |
| Eye tracking | Pupillometry, including tracking saccades, fixations, and pupil size (e.g. dilation) |
| Perspiration | Perspiration sensor |
| Blood pressure | Sphygmomanometer |
| Body temperature | Thermometer |
| Blood oxygen saturation | Pulse oximeter |
| Skin conductivity | Electrodermal activity |
| Autonomic tone | Derived from the above measurements |
| Genetic biomarkers | Genetic testing |
| Immune biomarkers including TNF-alpha, immune alteration (e.g ILs), oxidative stress, and hormones (e.g. cortisol) | Blood, saliva, and/or urine tests |
| Biological Rhythm | Derived from the above measurements |

The physiological parameters should have some correlation to a patient's risk of relapsing or otherwise engaging in addictive behavior or consuming an addictive chemical substance. With respect to biomarkers of psychological stress, biomarkers identified in Djuric et al., "Biomarkers of Psychological Stress in Health Disparities," Open Biomark J; 1:1-7; (Jan. 1, 2008) can be used to measure this parameter. The physiological parameters can be measured in a clinical/laboratory setting or in a naturalistic, "in the wild" non-clinical setting such as when the patient is at home, fluid intelligence, insight, decision making, working memory, attention, and fatigue. As with the physiological parameters, the cognitive parameters should have some correlation to a patient's risk of relapsing or otherwise engaging in addictive behavior or consuming an addictive chemical substance. Table II provides non-limiting examples of cognitive parameters that are gamified and that can be measured and exemplary methods and tests/tasks to measure such cognitive parameters.

TABLE II

| Cognitive Parameter | Exemplary Tests and Methods to Measure Cognitive Parameters |
| --- | --- |
| Temporal discounting | Kirby Delay Discounting Task |
| Alertness | Psychomotor Vigilance Task |
| Focused attention and response inhibition | Erikson Flanker Task |
| Working memory | N-Back Task, Digit span, number letter sequencing |
| Attentional bias towards emotional cues | Dot-Probe Task |
| Inflexible persistence | Wisconsin Card Sorting Task |
| Decision making | Iowa Gambling Task |
| Risk taking behavior | Balloon Analogue Risk Task |
| Inhibitory control | Anti-Saccade Task |
| Sustained attention | Sustained Attention |
| Executive function | Task Shifting or Set Shifting Task, trail making |

These cognitive tests can be administered in a clinical/laboratory setting or in a naturalistic, non-clinical setting such as when the patient is at home, work or other non-clinical setting. A smart device, such as a smartphone, tablet, or smart watch, can facilitate measuring these cognitive parameters in a naturalistic, non-clinical setting. For example, the Erikson Flanker, N-Back and Psychomotor Vigilance Tasks can be taken via an application on a smart phone, tablet, or smart watch. Again, collecting data with such wearables or mobile smart devices allow the patient's risk level to be assessed in an environment (e.g. home or work) where the patient is more likely to relapse or otherwise engage in the addictive behavior or consume the addictive substance.

Table III provides non-limiting examples of psychosocial and behavioral parameters that can be measured and exemplary tests, devices, and methods, to measure the behavioral parameters.

clinical setting. Non-limiting examples of types of behaviors and psychosocial factors that can be assessed by the subjective/self-reporting questionnaires include substance craving (as measured, for example, by visual, auditory or tactile cues associated with the patient's additive behavior or addictive chemical substance), nutrition, sleep, pain, depression, anxiety, workload, stress, recovery, and social support. A smart device, such as a smartphone, tablet, or personal computer can be used to administer the subjective/self-reporting questionnaires. Using embedded accelerometers and cameras, these smart devices can also be used to capture the patient's movements as well as facial expression analysis to analyze the patient's facial expressions that could indicate mood, anxiety, depression, agitation, and withdrawal signs. Again, collecting data using devices that do not require the patient to visit a clinic or lab, allows the patient's risk level to be assessed in an environment (e.g. home or work) where

TABLE III

| Psychosocial or Behavioral Parameter | Exemplary Tests and Methods to Measure Psychosocial or Behavioral Parameters |
| --- | --- |
| General Craving | Visual Analog Scale (VAS), Brief Substance Craving Scale |
| Cue Induced Craving | VAS Pre- and Post-Cue Exposure |
| Physical, Mental, and Social Health | Patient-Reported Outcomes Measurement Information System (PROMIS), Quality of Life SF-36 |
| Burnout | Burnout inventory or similar |
| Depression | Hamilton Depression Rating Scale |
| Anxiety | Hamilton Anxiety Rating Scale |
| Mania | Snaith-Hamilton Pleasure Scale, Young Mania Rating scale |
| Mood | Profile of Mood States; Positive Affect Negative Affect Schedule |
| Affect | Positive Affect Negative Affect Schedule |
| History of Trauma | Adverse Childhood Experiences |
| Impulsivity | Barratt Impulsiveness Scale |
| Anhedonia | Snaith-Hamilton Pleasure Scale |
| Sleep | Sleep onset & offset, sleep quality, sleep quantity, from wearable accelerometer and PPG |
| Activity level | Daily movement total, time of activities, from wearable accelerometer, steps |

The behavioral and psychosocial parameters can measure the patient's functionality, such as the patient's movement via wearable devices as well as subjective/self-reporting questionnaires. As with the physiological and cognitive parameters, the behavioral and psychosocial parameters should have some correlation to a patient's risk of relapsing or otherwise engaging in addictive behavior or consuming an addictive chemical substance. The subjective/self-reporting questionnaires can be collected in a clinical/laboratory setting or in a naturalistic, "in the wild" non-clinical setting such as when the patient is at home, work or other nonthe patient is more likely to relapse or otherwise engage in the addictive behavior or consume the addictive substance.

Regarding a patient's reaction to cues associated with the addictive behavior or the addictive chemical substance, the cue to which the patient is exposed can be a visual cue, an auditory cue, a tactile cue, an olfactory cue, or combinations thereof. The patient can be exposed to the cues via a smart phone, tablet, personal computer or laptop, for example, in a naturalistic non-clinical setting such as when the patient is at home, work or other non-clinical setting. The patient can be exposed to the cues via virtual reality, augmented reality, or mixed reality. The patient can be exposed to multiple cues during any assessment period and, in the case of polysubstance use or behavior, the patient can be exposed to cue associated with the different addictive substances or behaviors. In the case of addiction to a chemical substance, the cue can be, for example, images of drugs, drug paraphernalia, or individuals using drugs. The cue can be specific for the particular addictive behavior or addictive chemical substance for which the patient is seeking therapy and can include multiple cues, including multiple different types of cues. For example, if the patient is addicted to alcohol, the cue can be the scent of alcohol, a visual image of a bar, or the sound of an alcoholic beverage container being opened. If the patient is addicted to heroin, the cues can be visual images of heroin, a hypodermic needle, or a spoon and lighter, for example. If the patient is addicted to gambling, the cue can be a visual image of a casino or gambling chips, for example. The above examples are only exemplary and are meant to point out that the cues can be addiction specific and can stimulate different senses. The cues can also be similar to the patient's characteristics such as, for example, the patient's age, gender, ethnicity, preferred chemical substances and routes of administration. In other words, the cues to which the patient is exposed can be personalized to the specific patient seeking therapy.

Regarding sensory cues, such cues can also be measured in a naturalistic, "in the wild" setting using a wearable device, such as a smart phone for example. For example, such cues can be measured in a bar, social setting, etc. such that when the patient is feeling a craving or other characteristic associated with the addiction (e.g. anxiety) the patient can press a button and electrical activity can be recorded from a device implanted in a region of the patient's neural reward circuitry. Such recordings can be used to formulate a patient profile as described above and can be used to tailor/modify treatment. In particular, a physiological and cognitive profile of the patient can be created when the person is craving. The patient can also be immersed in a virtual reality setting, augmented reality setting, or mixed reality setting and exposed to cues associated with addiction. For example, the patient can be placed in virtual setting in which the patient is exposed to a wide variety of sensory cues associated with the patient's individual addiction. Such cues include, for example, visual cues, auditory cues, olfactory cues (e.g. smell triggers using a scent machine), and/or tactile cues (e.g. the feel of a pill bottle and the vibration which accompanies it to reflect that there are pills contained within it).

In addition to one or more combinations of physiological, cognitive, psychosocial and behavioral parameters, clinical data can also be part of the multi-dimensional feedback approach to improving addiction. Such clinical data can include, for example, the patient's clinical state, the patient's medical history (including family history), treatment history, and prescription intake and history. Further, in addition to one or more combinations of physiological, cognitive, psychosocial and behavioral parameters, sensory response (e.g. smell, touch, taste, vestibular, introception, vision, hearing, proprioception), motor, and autonomic responses can also be part of a multi-dimensional feedback approach to improve addiction. Regarding sensory cues, such cues can also be measured in a naturalistic, "in the wild" setting using a wearable device, such as a smart phone for example. For example, such cues can be measured in a bar, social setting, etc. such that when the patient is feeling a craving or other characteristic associated with the addiction (e.g. anxiety) the patient can press a button to record the time and location of the craving (timestamp and location based on GPS of their smartphone) and electrical activity can be recorded from their wearables and/or a device implanted in a region of the patient's neural reward circuitry. Such recordings can be used to formulate a patient profile as described above and can be used to tailor/modify treatment. In particular, a physiological and cognitive profile of the patient can be created when the person is craving.

The multi-dimensional feedback parameters as disclosed herein can also be used to optimize therapy such as parameters of the FUS/DBS/TMS signal, the target site (as discussed in more detail below), and how often the patient receives FUS/DBS/TMS therapy, for example.

Treatment can also be individualized based on baseline parameter values. For example, if the patient exhibits cognitive deficits, behavioral therapy (e.g. cognitive-behavioral therapy) can be modified appropriately and tailored to the patient's level of functioning (e.g., simplifying strategies and techniques), which can lead to improved treatment outcomes. If craving is elevated at baseline, a greater focus can be placed on identifying triggers and refusal techniques. If emotional symptoms are elevated at baseline and contribute to relapse, more adaptive mechanisms for dealing with distress can be identified. If trauma is a contributing factor, trauma therapy can be incorporated into the treatment plan.

In another aspect, a method of selecting a patient suffering from addiction to an addictive behavior or addictive chemical substance for treatment for such addiction is provided. Such a method includes obtaining a measurement of baseline values of one or more combinations of a physiological, a cognitive, a psychosocial, and a behavioral parameter of the patient. The method further comprises determining threshold values for the one or more combinations of the physiological, cognitive, psychosocial, and behavioral parameters. The method further includes selecting a patient for therapy upon a determination that the baseline values are different from the threshold values. Once the patient is selected for the therapy, the method can further include applying an initial focused ultrasound signal, an initial deep brain stimulation signal, and/or an initial transcranial magnetic stimulation signal to the patient to improve the patient's addiction.

In another aspect, a method of monitoring addiction to an addictive behavior or addictive chemical substance in a patient is provided. Such a method can comprise obtaining a measurement of baseline values of one or more combinations of a physiological, a cognitive, a psychosocial, and a behavioral parameter of the patient, applying an initial focused ultrasound signal, an initial deep brain stimulation signal, or an initial transcranial magnetic stimulation signal to a neural target site of the patient, obtaining a subsequent measurement of resultant values of the one or more combinations of a physiological, a cognitive, a psychosocial, and a behavioral parameter of the patient during or after application of the initial focused ultrasound signal, the initial deep brain stimulation signal, or the initial transcranial magnetic stimulation signal, obtaining a comparison of the resultant values to the baseline values, and monitoring the patient's addiction based on the comparison of the resultant values to the baseline values.

In another aspect, a method of notifying a patient or third party of a patient's addiction to an addictive behavior or addictive chemical substance is provided. Such a method can comprise obtaining a measurement of baseline values of one or more combinations of a physiological, a cognitive, a psychosocial, and a behavioral parameter of the patient;

applying an initial focused ultrasound signal, an initial deep brain stimulation, or an initial transcranial magnetic stimulation, to a neural target site of the patient; obtaining a subsequent measurement of resultant values of the one or more combinations of the physiological, the cognitive, the psychosocial, and the behavioral parameter of the patient during or after application of the initial focused ultrasound signal, initial deep brain stimulation, or transcranial magnetic stimulation; obtaining a comparison of the resultant values to the baseline values to determine if the patient's addiction has improved, applying or adjusting application of one or more subsequent focused ultrasound signals, deep brain stimulation signals, or transcranial magnetic stimulation signals to the neural target site upon a determination that the patient's addiction has not improved; and notifying the patient or third party upon the determination that the patient's addiction has not improved. The third party can be, for example but not limited to, a physician, a therapist, a nurse, a family member of the patient, a counselor, a case manager, a peer recovery coach, or a 12-step sponsor.

In another aspect, a method of identifying a target neural site for applying a FUS/DBS/TMS signal to a patient suffering from addiction to an addictive behavior or addictive chemical substance is provided. Such a method can comprise obtaining a measurement of baseline values of one or more combinations of a physiological, a cognitive, a psychosocial, and a behavioral parameter of the patient. Such a method can further comprise applying an initial FUS/DBS/TMS signal to an initial neural site of the patient and obtaining a subsequent measurement of resultant values of the one or more combinations of the physiological, the cognitive, the psychosocial, and the behavioral parameter of the patient during or after application of the initial FUS/DBS/TMS signal. The method can further comprise obtaining a comparison of the resultant values to the baseline values and determining if the initial neural site improves the patient's addiction. If application of the initial FUS/DBS/TMS signal does improve the patient's addiction, the initial neural site can be designated as the target neural site. If the initial FUS/DBS/TMS signal does not improve the patient's addiction, the steps can be repeated until the neural site for which application of a FUS/DBS/TMS signal improves addiction has been identified. When such a neural site has been identified, the neural site can be designated as the target neural site for future FUS/DBS/TMS therapy. Such a method can be used by a clinician to hone into the exact location of a neural site, such as, for example, a specific part of the nucleus accumbens (e.g. the core or the shell), which improves the patient's addiction.

Treatment can be individualized in other ways as well. Based on the form(s) of neuromodulation that are effective in a certain patient population based on physiological, cognitive, psychosocial and behavior data, an appropriate form of neuromodulation can be determined and utilized for a patient in the same patient population (e.g. suffering from addiction to the same addictive substance or behavior of the patient population studied). Therefore, physiological, cognitive, psychosocial and behavior data can be used not only to mitigate relapses, but also can be used to determine which forms of neuromodulation would be appropriate for a particular patient. For example, with TMS, a baseline MRI/fMRI can be taken prior to the first TMS session and then after the first session. With a large enough sample size, it can be predicted which patient is most likely to the best response to TMS treatment based on baseline MRI/fMRI and/or acute changes following the first session. Further, if it is determined that a certain patient population with impaired decision making respond better to TMS, such TMS therapy can be used for future individual patients with similar impaired decision making.

As disclosed, certain steps of methods disclosed herein are implemented in a clinical setting, e.g., measuring baseline values, applying initial/subsequent FUS/DBS/TMS, performing medical imaging, while others can be implemented in a non-clinical setting. Therefore, it will be appreciated that a system for implementing the therapy can take into account the variability with which the clinical/non-clinical implementations can be executed.

Figure 2:
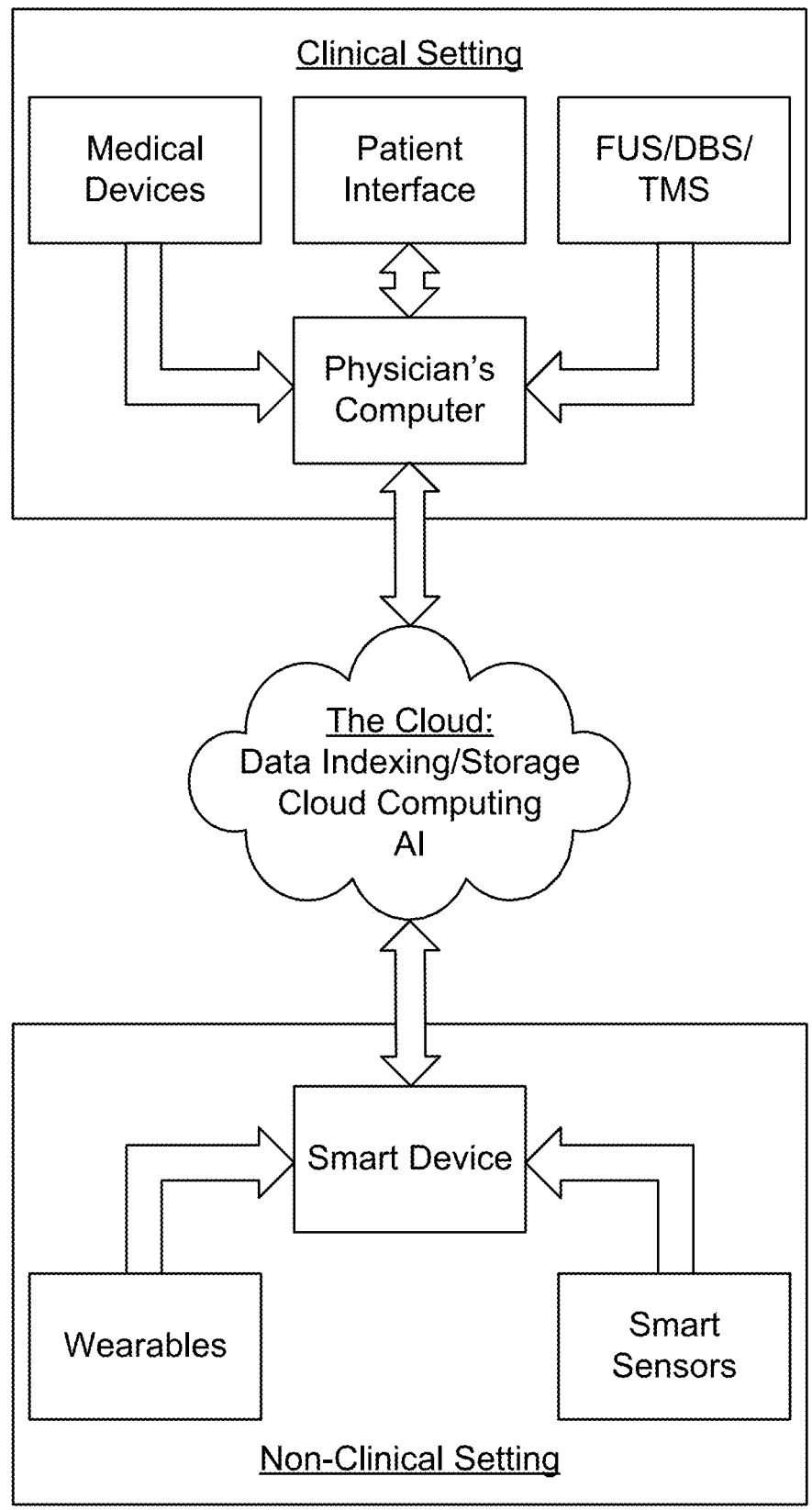
FIG. 2 is a block diagram of a system according to an aspect of the present disclosure.

Referring to FIG. 2, the system can be cloud-based, which can allow for data indexing/storage, cloud computing, and utilizing artificial intelligence (AI) to interpret data obtained in both the clinical and non-clinical settings. Preferably the data can be analyzed in real time or near real time. The cloud-based implementation allows for centralized storage and computing while facilitating remote access by both the physician and the patient. The access to AI in cloud-based computing can be especially advantageous, for example, in analyzing patient movement (facial expressions, mood, anxiety, depression, agitation, etc).

In the clinical setting, the system can include a physician's computer that interfaces with the cloud and also the equipment, i.e., medical devices, wearables devices, and a patient interface, used to measure the baseline and/or subsequent values of physiological, cognitive, and behavioral patient parameters, as well as the focused ultrasound equipment used to administer the FUS therapy to the patient. The medical devices can include the equipment listed above in Table I for measuring the various physiological parameters. These devices can communicate the measured physiological parameters to the physician computer automatically, e.g., via wired or wireless connectivity, or can be entered manually into the physician's computer.

The patient interface can be any device through which the patient can enter or otherwise submit cognitive and behavioral parameters. The patient interface can, for example, be a tablet computer, personal computer (desktop or notebook), or a smart phone. The cognitive parameters measured via the patient interface can be those set forth above in Table II. The patient interface can communicate the measured cognitive and behavioral parameters to the physician computer automatically, e.g., via wired or wireless connectivity, or can be entered manually into the physician's computer.

The FUS/DBS/TMS system can be connected to the physician's computer only to the extent necessary to administer the FUS/DBS/TMS therapy to treat the patient and to record the therapeutic parameters of the FUS/DBS/TMS therapy used to treat the patient. For example, the FUS/DBS/TMS therapy parameters can be delivered to the FUS/DBS/TMS system from the physician's computer and data recorded by the FUS/DBS/TMS system during treatment can be passed back to the physician's computer. The FUS/DBS/TMS system can send/receive the FUS/DBS/TMS therapy data to/from the physician computer automatically, e.g., via wired or wireless connectivity, or can be entered manually.

The comparison of resultant values to baseline values and the data analysis used to make those determinations can be performed locally on the physician's computer or in the cloud. In a local implementation, the cloud can serve as a central data depository or hub that facilitates access via the physician's computer so that the comparison/analysis can be performed. In a cloud-based implementation, the comparison/analysis can be performed via cloud computing which, as mentioned previously, can offer certain advantages. Cloud computing can provide processing power orders of magnitude greater than that available locally on a PC which can, for example, allow for complex operations, such as AI engines for analyzing patient movements, facial expressions, mood, anxiety, depression, agitation, etc.

Figure 3:
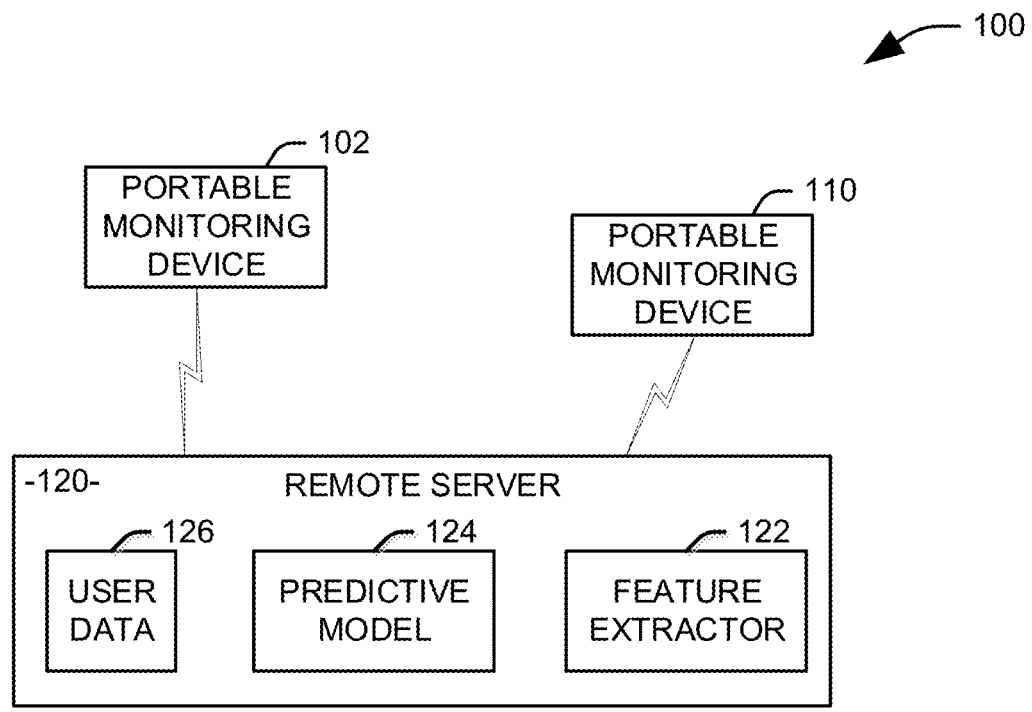
FIG. 3 is block diagram of a system according to an aspect of the present disclosure.

FIG. 3 illustrates a system 100 for monitoring the patient's addiction state or profile such as the patient's craving relevant parameters or symptom or symptoms associated with addiction such as anxiety, depression and craving, all of which are separate variables or in combination contribute to the addiction state.

System 100 can include a plurality of portable monitoring devices 102 and 110 that includes sensors for monitoring systems tracking the craving and other addiction parameters of the patient. It will be appreciated that a given portable monitoring device (e.g. 102) can either communicate directly with a remote server 120 to provide the patient's craving relevant parameters to the server or with another portable monitoring device (e.g. 110) that relays the patient's craving relevant parameters to the server. By using portable monitoring devices 102 and 110, measurements can be made continuous from non-clinical settings.

The remote server can analyze the data collected by the portable monitoring devices 102 and 110. The remote server 120 can be implemented as a dedicated physical server or as part of a cloud server arrangement. In addition to the remote server, data can be analyzed on the local device itself and/or in a federated learning mechanism. Information received from the portable monitoring devices 102 and 110 can be provided to a feature extractor 122 that extracts a plurality of features for use as a predictive model 124. The feature extractor 122 can determine categorical and continuous parameters representing the craving relevant parameters. In one example, the parameters can include descriptive statistics, such as measures of central tendency (e.g., median, mode, arithmetic mean, or geometric mean) and measures of deviation (e.g., range, interquartile range, variance, standard deviation, etc.) of time series of the monitored parameters, as well as the time series themselves. In one implementation, the feature extractor 124 can perform a wavelet transform on the time series of values for one or more parameters to provide a set of wavelet coefficients. It will be appreciated that the wavelet transform used herein is two-dimensional, such that the coefficients can be envisioned as a two-dimensional array across time and either frequency or scale.

For a given time series of parameters, xi, the wavelet coefficients, Wa(n), produced in a wavelet decomposition can be defined as:

$$W_a(n) = a^{-1} \sum_{i=1}^{M} x_i \psi\left(\frac{i-n}{a}\right) \qquad \text{Eq. 3}$$

wherein $\psi$ is the wavelet function, M is the length of the time series, and a and n define the coefficient computation locations.

Additionally or alternatively, the craving-relevant parameters can be used to assign a plurality of categorical parameters to the user according to thresholds for craving-relevant parameters or rule sets that act upon time series of values for the craving-relevant parameters, for example, representing the presence or absence of a given condition or behavior. The predictive model 124 can also utilize patient data 126 stored at the remote server 120, including, for example, employment information (e.g., title, department, shift), age, sex, home zip code, genomic data, nutritional information, medication intake, household information (e.g., type of home, number and age of residents), social and psychosocial, consumer spending and profiles, financial, food safety, physical abuse, and relevant medical history. In addition, the model can combine multiple patients to interact together to refine prediction such as social model of spouse, children, family, sponsor, friends and others.

The predictive model 124 can utilize one or more pattern recognition algorithms, each of which analyze the extracted features or a subset of the extracted features to assign a continuous or categorical parameter to the patient. In one example, the assigned parameter can represent a predicted "relapse" of the patient, that is, a predicted decrease in cognitive function, increase stress, increased cravings, pain, or depression, to an extent that will materially affect chances of substance use. In this example, sleep, activity data, and physiological data can be used along with results from a cognitive assessment and behavioral reporting applications to provide a continuous index representing the degree of changes of relapse by the patient. It will be appreciated, however, that additional or alternative features can be used in the analysis and that the index can be replaced with a categorical classification (e.g., "near baseline", "reduced", "impaired") in some implementations. In another example, the predictive model 124 can be used to provide an index representing an internal marker of brain body balance, homeostasis, resilience and wellness. In yet another example, the predictive model 124 can be used to provide an index representing a measure of homeostasis for the patient or to predict levels of the autonomic nervous system tone.

Where multiple classification or regression models are used, an arbitration element can be utilized to provide a coherent result from the plurality of models. The training process of a given classifier will vary with its implementation, but training generally involves a statistical aggregation of training data into one or more parameters associated with the output class. The training process can be accomplished on a remote system and/or on the local device or wearable, app. The training process can be achieved in a federated or non-federated fashion. For rule-based models, such as decision trees, domain knowledge, for example, as provided by one or more human experts, can be used in place of or to supplement training data in selecting rules for classifying a user using the extracted features. Any of a variety of techniques can be utilized for the classification algorithm, including support vector machines, regression models, self-organized maps, fuzzy logic systems, data fusion processes, boosting and bagging methods, rule-based systems, or artificial neural networks.

Federated learning (aka collaborative learning) is a machine learning technique that trains an algorithm across multiple decentralized edge devices or servers holding local data samples, without exchanging their data samples. This approach stands in contrast to traditional centralized machine learning techniques where all data samples are uploaded to one server, as well as to more classical decentralized approaches which assume that local data samples are identically distributed. Federated learning enables multiple actors to build a common, robust machine learning model without sharing data, thus addressing critical issues such as data privacy, data security, data access rights, and access to heterogeneous data. Its applications are spread over a number of industries including defense, telecommunications, IoT, or pharmaceutics.

For example, an SVM classifier can utilize a plurality of functions, referred to as hyperplanes, to conceptually divide boundaries in the N-dimensional feature space, where each of the N dimensions represents one associated feature of the feature vector. The boundaries define a range of feature values associated with each class. Accordingly, an output class and an associated confidence value can be determined for a given input feature vector according to its position in feature space relative to the boundaries. In one implementation, the SVM can be implemented via a kernel method using a linear or non-linear kernel.

An ANN classifier comprises a plurality of nodes having a plurality of interconnections. The values from the feature vector are provided to a plurality of input nodes. The input nodes each provide these input values to layers of one or more intermediate nodes. A given intermediate node receives one or more output values from previous nodes. The received values are weighted according to a series of weights established during the training of the classifier. An intermediate node translates its received values into a single output according to a transfer function at the node. For example, the intermediate node can sum the received values and subject the sum to a binary step function. A final layer of nodes provides the confidence values for the output classes of the ANN, with each node having an associated value representing a confidence for one of the associated output classes of the classifier.

Many ANN classifiers are fully-connected and feedforward. A convolutional neural network, however, includes convolutional layers in which nodes from a previous layer are only connected to a subset of the nodes in the convolutional layer. Recurrent neural networks are a class of neural networks in which connections between nodes form a directed graph along a temporal sequence. Unlike a feedforward network, recurrent neural networks can incorporate feedback from states caused by earlier inputs, such that an output of the recurrent neural network for a given input can be a function of not only the input but one or more previous inputs. As an example, Long Short-Term Memory (LSTM) networks are a modified version of recurrent neural networks, which makes it easier to remember past data in memory.

A rule-based classifier applies a set of logical rules to the extracted features to select an output class. Generally, the rules are applied in order, with the logical result at each step influencing the analysis at later steps. The specific rules and their sequence can be determined from any or all of training data, analogical reasoning from previous cases, or existing domain knowledge. One example of a rule-based classifier is a decision tree algorithm, in which the values of features in a feature set are compared to corresponding threshold in a hierarchical tree structure to select a class for the feature vector. A random forest classifier is a modification of the decision tree algorithm using a bootstrap aggregating, or "bagging" approach. In this approach, multiple decision trees are trained on random samples of the training set, and an average (e.g., mean, median, or mode) result across the plurality of decision trees is returned. For a classification task, the result from each tree would be categorical, and thus a modal outcome can be used.

In one implementation, the predictive model 124 can include a constituent model that predicts future values for craving-related parameters, such as a convolutional neural network that is provided with one or more two-dimensional arrays of wavelet transform coefficients as an input. The wavelet coefficients detect not only changes in time, but also in temporal patterns, and can thus reflect changes in the ordinary biological rhythms of the patient. In one implementation, the craving-related parameters predicted by the constituent models can include measured parameters such as heart rate, temperature, and heart rate variability as well as self-report questions such as encountering trigger, feeling depressed, or increased life stress. It will be appreciated that a given constituent model can use data in addition to the wavelet coefficients, such as other measured features and user data 126 to provide these predictions.

The output of the predictive model 124 can be a categorical parameter representing a status of the patient, such as "increased craving" or "decreased craving", "relapse" or "not relapse"" A categorical parameter can also represent ranges of likelihoods for a current or predicted status. In another implementation, the output of the predictive model 124 can be a continuous parameter, such as a likelihood of a predicted or current status. In one example, the predictive model 124 can include one or more constituent models that predict a value for a craving-related parameter at a future time. For example, a given model can predict a physiological or behavior state for a patient at a future time based on received data from the feature extractor 122 and stored user data 126. These predicted values can be provided to a patient/user or utilized as inputs to additional models to predict a status of the patient at the future time. In one example, the predictive model 124 includes a plurality of convolutional neural networks, each configured to predict a future value for a craving-related parameter, with the predicted values from the plurality of convolutional neural networks used to predict a future status of the patient.

Figure 4:
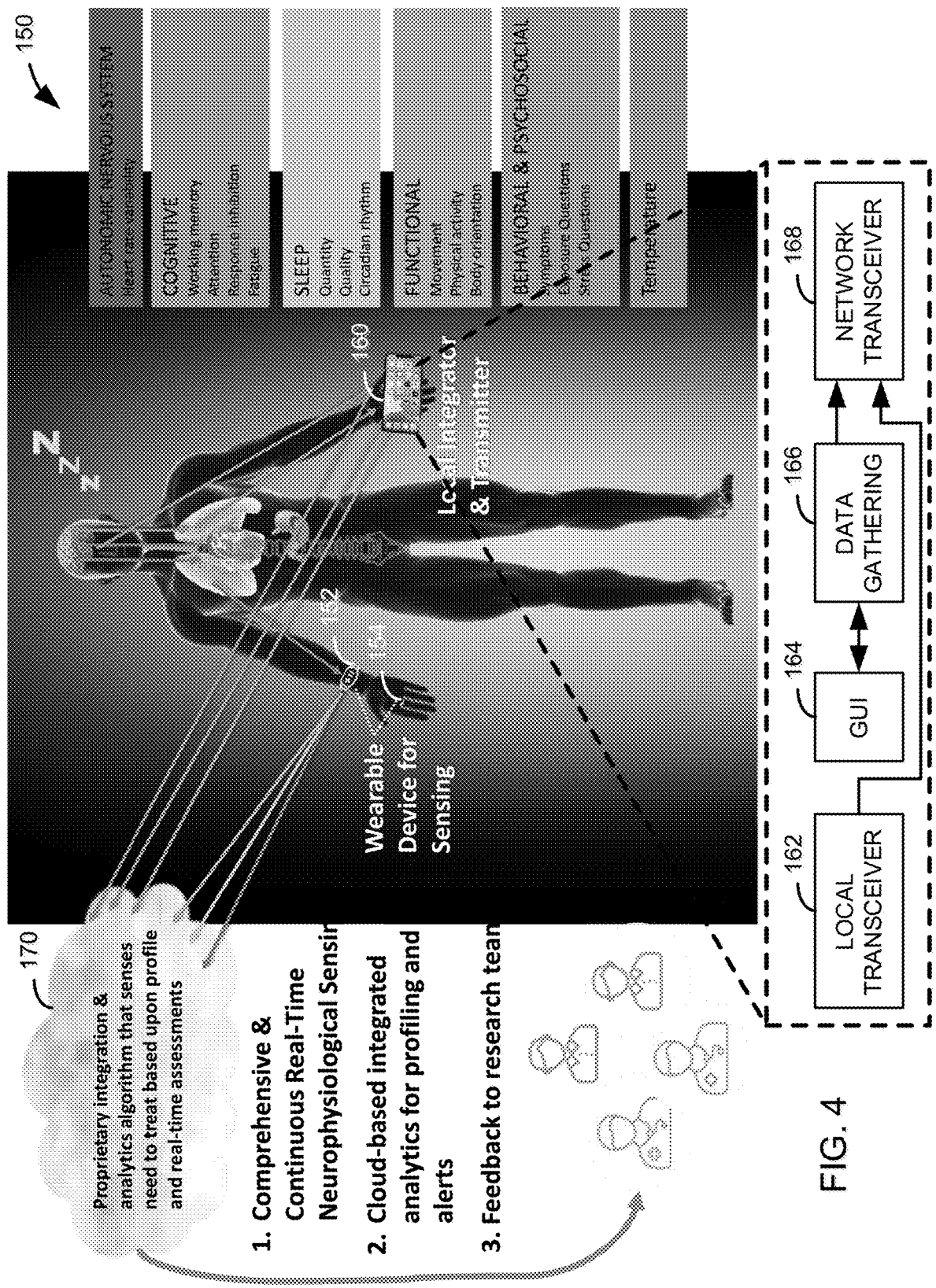
FIG. 4 is a schematic illustration of FIG. 3 using a plurality of portable monitoring devices.

FIG. 4 is a schematic example 150 of the system of FIG. 1 using a plurality of portable monitoring devices 152, 154, and 160. In the illustrated implementation, the first and second portable monitoring devices 152 and 154 are wearable devices, worn on the wrist and finger, respectively. Craving-relevant parameters monitored by the first and second portable monitoring devices 152 and 154 can include, for example, heart rate, heart rate variability, metrics of sleep quality, biological rhythm variations, metrics of sleep quantity, physical activity of the user, body orientation, movement, arterial blood pressure, respiratory rate, peripheral arterial oxyhemoglobin saturation, as measured by pulse oximetry, maximum oxygen consumption, temperature, and temperature variation. Wearable devices, as used herein, can include any wearable items implemented with appropriate sensors, including watches, wristbands, rings, headbands, headbands, and other wearable items that can maintain sensors in an appropriate position for monitoring the craving-relevant parameters. It will be appreciated that a given wearable device 152 and 154 can monitor many of these parameters with great frequency (e.g., every five minutes) allowing for a detailed time series of data to be generated.

The system 150 can further include a mobile device 160 that communicates with the first and second portable monitoring devices 152 and 154 via a local transceiver 162. The mobile device 160 can also include a graphical user interface 164 that allows a patient/user to interact with one or more data gathering applications 166 stored at the base unit. One example of a possible data gathering applications can include a cognitive assessment application that tests various measures of cognitive function. These can include, for example, working memory, attention, and response inhibition, fatigue, cognition. Further, these metrics can be compared to an established baseline to estimate a measure of fatigue for the patient. Another data gathering application can include a questionnaire application that allows the user to self-report craving, mood, mental, physical, and emotional states, and stress. In general, the data gathering applications 166 can be selected and configured to monitor each parameters as listed in Tables I. II and/or III.

The mobile device 160 can further comprise a network transceiver 168 via which the system 150 communicates with a remote server 170 via a local area network or Internet connection. In this example, the remote server 170 includes a predictive model implemented as a recurrent neural network, specifically a network with a long short-term memory architecture. In this example, craving-relevant parameters from the wearable devices 152 and 154, in combination with questionnaire responses and cognitive assessment, can be provided to the predictive model as time series along with other relevant data. An output of the model can be an index representing craving and relapse risk posed to the patient.

Figure 5:
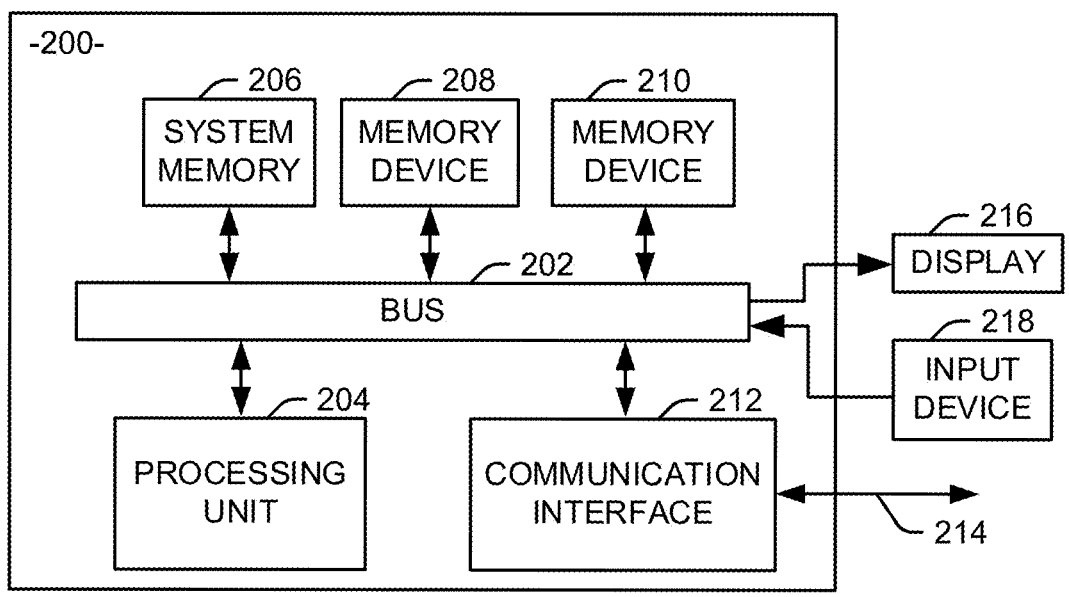
FIG. 5 is a schematic block diagram illustrating an exemplary system of hardware components.

FIG. 5 is a schematic block diagram illustrating an exemplary system 200 of hardware components capable of implementing examples of the systems and methods disclosed herein. The system 200 can include various systems and subsystems. The system 200 can be a personal computer, a laptop computer, a workstation, a computer system, an appliance, an application-specific integrated circuit (ASIC), a server, a server BladeCenter, a server farm, etc.

The system 200 can include a system bus 202, a processing unit 204, a system memory 206, memory devices 208 and 210, a communication interface 212 (e.g., a network interface), a communication link 214, a display 216 (e.g., a video screen), and an input device 218 (e.g., a keyboard, touch screen, and/or a mouse). The system bus 202 can be in communication with the processing unit 204 and the system memory 206. The additional memory devices 208 and 210, such as a hard disk drive, server, standalone database, or other non-volatile memory, can also be in communication with the system bus 202. The system bus 202 interconnects the processing unit 204, the memory devices 206-210, the communication interface 212, the display 216, and the input device 218. In some examples, the system bus 202 also interconnects an additional port (not shown), such as a universal serial bus (USB) port.

The processing unit 204 can be a computing device and can include an application-specific integrated circuit (ASIC). The processing unit 204 executes a set of instructions to implement the operations of examples disclosed herein. The processing unit can include a processing core.

The additional memory devices 206, 208, and 210 can store data, programs, instructions, database queries in text or compiled form, and any other information that may be needed to operate a computer. The memories 206, 208 and 210 can be implemented as computer-readable media (integrated or removable), such as a memory card, disk drive, compact disk (CD), or server accessible over a network. In certain examples, the memories 206, 208 and 210 can comprise text, images, video, and/or audio, portions of which can be available in formats comprehensible to human beings.

Additionally or alternatively, the system 200 can access an external data source or query source through the communication interface 212, which can communicate with the system bus 202 and the communication link 214.

In operation, the system 200 can be used to implement one or more parts of a system for monitoring addiction of a patient in accordance with methods disclosed herein. Computer executable logic for implementing the monitoring system resides on one or more of the system memory 206, and the memory devices 208 and 210 in accordance with certain examples. The processing unit 204 executes one or more computer executable instructions originating from the system memory 206 and the memory devices 208 and 210. The term "computer readable medium" as used herein refers to a medium that participates in providing instructions to the processing unit 204 for execution. This medium may be distributed across multiple discrete assemblies all operatively connected to a common processor or set of related processors. Specific details are given in the above description to provide a thorough understanding of the embodiments. However, it is understood that the embodiments can be practiced without these specific details. For example, physical components can be shown in block diagrams in order not to obscure the embodiments in unnecessary detail. In other instances, well-known circuits, processes, algorithms, structures, and techniques can be shown without unnecessary detail in order to avoid obscuring the embodiments.

Implementation of the techniques, blocks, steps and means described above can be done in various ways. For example, these techniques, blocks, steps and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments can be described as a process which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but could have additional steps not included in the figure. A process can correspond to a method, a function, a procedure, a subroutine, a subprogram, etc. When a process corresponds to a function, its termination corresponds to a return of the function to the calling function or the main function.

Furthermore, embodiments can be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine-readable medium such as a storage medium. A code segment or machine-executable instruction can represent a procedure, a function, a subprogram, a program, a routine, a subroutine, a module, a software package, a script, a class, or any combination of instructions, data structures, and/or program statements. A code segment can be coupled to another code segment or a hardware circuit by passing and/or receiving information, data, arguments, parameters, and/or memory contents. Information, arguments, parameters, data, etc. can be passed, forwarded, or transmitted via any suitable means including memory sharing, message passing, ticket passing, network transmission, etc.

For a firmware and/or software implementation, the methodologies can be implemented with modules (e.g., procedures, functions, and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" can represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

Although the present application has been described primarily with respect to FUS/DBS/TMS, aspects of methodologies and systems as disclosed herein can be used with other treatment modalities or in addition to other treatment modalities including with pharmaceutical or biological agents. Further, a patient's assessment as disclosed above can be used to guide parallel treatment with medications. For example, if someone experiences elevated or dysregulated heart rate either in the context of cravings or independently, a clinician may consider administering or prescribing to the patient a medication such as propranolol.

Also, similar to how individualizing treatment is described above, if a patient demonstrates cognitive deficits at baseline as detected by a smartphone app for example, augmenting treatment with a cognitive enhancing agent, such as modafinil, could be administered.

Although the present application has been described primarily with respect to FUS/DBS/TMS, aspects of methodologies and systems as disclosed herein can be used with other treatment modalities or in addition to other treatment modalities including with pharmaceutical or biological agents. Further, a patient's assessment as disclosed above can be used to guide parallel treatment with medications. For example, if someone experiences elevated or dysregulated heart rate either in the context of cravings or independently, a clinician may consider administering or prescribing to the patient a medication such as propranolol.

Also, similar to how individualizing treatment is described above, if a patient demonstrates cognitive deficits at baseline as detected by a smartphone app for example, augmenting treatment with a cognitive enhancing agent, such as modafinil, could be administered. Existing medication could also be adjusted based on the multi-dimensional feedback approach described above. Treatments with TMS, FUS, or DBS can be modulatory, regulatory, open the blood brain barrier by itself or coupled with gene therapy, immunotherapy, stem cells and other targeted therapies to a brain target region, and can create a temporary or permanent lesion in the brain.

EXAMPLE

An example of how multidimensional monitoring can help identify the effects of increases in a patient's stress, which can lead to increase cravings and thus substance relapse begins with establishing a normal baseline of a patient based on the multidimensional factors of physiological, cognitive, psychosocial and behavioral parameters. A patient can have an established pattern of heart rate variability throughout the day such as a mean of 55 ms with fluctuation of +−15 ms. Similarly, a patient can have cognitive score patterns as measured by the flanker task as well where the patient normally obtains a 97% of incongruent signals correct with a reaction time of 248 ms and scores of the psychomotor vigilance task of 285 ms. Additionally, a patient can have a pattern of sleep onset, offset times, and quality measures. The daily psychosocial questions can have low craving scores as well as low values for depression. Using the methodology disclosed herein, state changes in a patient can be detected through the real-time monitoring of the patient and the personalize algorithm as disclosed herein if these normal patterns start to fluctuate to show signs to increases stress. Examples of this stress state can be a decrease in heart rate variability (25 ms) thus showing a more sympathetic state and changes in the cognitive scores such as increases response time for both the flanker task (478 ms) and psychomotor vigilance (515 ms) task, which indicates decreases response inhibition and lose of focus of attention. Erratic changes in sleep timing and more disturbed sleep quality can also be signs of increased stress state. Changes on the established normative values across the multidimensional factors and the personalized algorithm can trigger alerts that a person is entering into a stress state which can increase the risk of relapse and/or they may be an automatic adjustment to treatment in the case of DBS and/or the patient may be brought into a clinical setting for DBS parameter adjustment.

Each of the disclosed aspects and embodiments of the present disclosure may be considered individually or in combination with other aspects, embodiments, and variations of the disclosure. Further, while certain features of embodiments and aspects of the present disclosure may be shown in only certain figures or otherwise described in the certain parts of the disclosure, such features can be incorporated into other embodiments and aspects shown in other figures or other parts of the disclosure. Along the same lines, certain features of embodiments and aspects of the present disclosure that are shown in certain figures or otherwise described in certain parts of the disclosure can be optional or deleted from such embodiments and aspects. Additionally, when describing a range, all points within that range are included in this disclosure. Further, unless otherwise specified, none of the steps of the methods of the present disclosure are confined to any particular order of performance. Furthermore, all references cited herein are incorporated by reference in their entirety.

What is claimed is:

1. A method of improving addiction to an addictive behavior or addictive chemical substance in a patient in need thereof comprising:
    obtaining a measurement of baseline values of a physiological, a cognitive, a psychosocial, and a behavioral parameter of the patient; applying an initial focused ultrasound signal, an initial deep brain stimulation signal, or an initial transcranial magnetic stimulation signal to a neural target site of the patient;
    obtaining a subsequent measurement of resultant values of the physiological, the cognitive, the psychosocial, and the behavioral parameter of the patient during or after application of the initial focused ultrasound signal, the initial deep brain stimulation signal, or the initial transcranial magnetic stimulation signal;
    obtaining a comparison of the resultant values to the baseline values to determine if the patient's addiction has improved; and
    applying or adjusting application of one or more subsequent focused ultrasound signals, deep brain stimulation signals, transcranial magnetic stimulation signals to the neural target site upon a determination that the patient's addiction has not improved to improve the patient's addiction.

2. The method of claim 1, wherein adjusting application of one or more subsequent focused ultrasound signals, deep brain stimulation signals, or transcranial magnetic stimulation signals comprises modulating the frequency, pulse width, duty cycle, duration, intensity, sonication elements, magnetic elements, waveform, dose, cumulative dose, or combinations thereof of the one or more subsequent focused ultrasound signals, deep brain stimulation signals, or transcranial magnetic stimulation signals.

3. The method of claim 1, further comprising not applying one or more subsequent focused ultrasound signals, deep brain stimulation signals, or transcranial stimulation signals to the target site upon a determination that the patient's addiction has improved.

4. The method of claim 1, further comprising applying or adjusting application of one or more subsequent focused ultrasound signals, deep brain stimulation signals, or transcranial stimulation signals to the target site upon a determination that the patient's addiction has improved.

5. The method of claim 4, further comprising applying or adjusting application of one or more subsequent focused ultrasound signals, deep brain stimulation signals, or transcranial stimulation signals to the target site upon a determination that the patient's addiction has improved comprises applying or adjusting application of one or more subsequent focused ultrasound signals.

6. The method of claim 4, further comprising applying or adjusting application of one or more subsequent focused ultrasound signals, deep brain stimulation signals, or transcranial stimulation signals to the target site upon a determination that the patient's addiction has improved comprises applying or adjusting application of one or more subsequent deep brain stimulation signals.

7. The method of claim 4, further comprising applying or adjusting application of one or more subsequent focused ultrasound signals, deep brain stimulation signals, or transcranial stimulation signals to the target site upon a determination that the patient's addiction has improved comprises applying or adjusting application of one or more subsequent transcranial magnetic stimulation signals.

8. The method of claim 1, wherein improving the addiction comprises reducing the patient's craving of the addictive behavior or the addictive chemical substance.

9. The method of claim 8, wherein adjusting application of the one or more subsequent focused ultrasound signals, deep brain stimulation signals, or transcranial stimulation signals to the target site comprises modulating the frequency, duration, intensity, pattern of change or ratio of the frequency, duration, and/or intensity, or combinations thereof of the one or more subsequent focused ultrasound signals, deep brain stimulation signals, or transcranial stimulation signals comprises adjusting application of the one or more subsequent focused ultrasound signals.

10. The method of claim 8, wherein adjusting application of the one or more subsequent focused ultrasound signals, deep brain stimulation signals, or transcranial stimulation signals to the target site comprises modulating the frequency, duration, intensity, pattern of change or ratio of the frequency, duration, and/or intensity, or combinations thereof of the one or more subsequent focused ultrasound signals, deep brain stimulation signals, or transcranial stimulation signals comprises adjusting application of the one or more subsequent deep brain stimulation signals.

11. The method of claim 8, wherein adjusting application of the one or more subsequent focused ultrasound signals, deep brain stimulation signals, or transcranial stimulation signals to the target site comprises modulating the frequency, duration, intensity, pattern of change or ratio of the frequency, duration, and/or intensity, or combinations thereof of the one or more subsequent focused ultrasound signals, deep brain stimulation signals, or transcranial stimulation signals comprises adjusting application of the one or more subsequent transcranial magnetic stimulation signals.

12. The method of claim 1, wherein:
applying an initial focused ultrasound signal, an initial deep brain stimulation signal, or an initial transcranial magnetic stimulation signal to a neural target site of the patient comprises applying an initial focused ultrasound signal to the neural target site;
obtaining a subsequent measurement of resultant values of the physiological, the cognitive, the psychosocial, and the behavioral parameter of the patient during or after application of the initial focused ultrasound signal, the initial deep brain stimulation signal, or the initial transcranial magnetic stimulation signal comprises obtaining a subsequent measurement of resultant values during or after application of the initial focused ultrasound signal; and
applying or adjusting application of one or more subsequent focused ultrasound signals, deep brain stimulation signals, transcranial magnetic stimulation signals to the neural target site upon a determination that the patient's addiction has not improved to improve the patient's addiction comprises applying or adjusting application or one or more subsequent focused ultrasound signals.

13. The method of claim 1, wherein:
applying an initial focused ultrasound signal, an initial deep brain stimulation signal, or an initial transcranial magnetic stimulation signal to a neural target site of the patient comprises applying an initial deep brain stimulation signal to the neural target site;
obtaining a subsequent measurement of resultant values of the physiological, the cognitive, the psychosocial, and the behavioral parameter of the patient during or after application of the initial focused ultrasound signal, the initial deep brain stimulation signal, or the initial transcranial magnetic stimulation signal comprises obtaining a subsequent measurement of resultant values during or after application of the initial deep brain stimulation signal; and
applying or adjusting application of one or more subsequent focused ultrasound signals, deep brain stimulation signals, transcranial magnetic stimulation signals to the neural target site upon a determination that the patient's addiction has not improved to improve the patient's addiction comprises applying or adjusting application or one or more subsequent deep brain stimulation signals.

14. The method of claim 1, wherein:
applying an initial focused ultrasound signal, an initial deep brain stimulation signal, or an initial transcranial magnetic stimulation signal to a neural target site of the patient comprises applying an initial transcranial magnetic stimulation signal to the neural target site;
obtaining a subsequent measurement of resultant values of the physiological, the cognitive, the psychosocial, and the behavioral parameter of the patient during or after application of the initial focused ultrasound signal, the initial deep brain stimulation signal, or the initial transcranial magnetic stimulation signal comprises obtaining a subsequent measurement of resultant values during or after application of the initial transcranial magnetic stimulation signal; and applying or adjusting application of one or more subsequent focused ultrasound signals, deep brain stimulation signals, transcranial magnetic stimulation signals to the neural target site upon a determination that the patient's addiction has not improved to improve the patient's addiction comprises applying or adjusting application or one or more subsequent transcranial magnetic stimulation signals.

15. The method of claim 1, wherein obtaining the comparison of the resultant values to the baseline values to determine if the patient's addiction has improved comprises providing one of the baseline values and the resultant values and a set of values representing a deviation of the resultant values from the baseline values to a machine learning model.

16. The method of claim 15, wherein the set of values representing a deviation of the resultant values from the baseline values is provided as a two-dimensional array of wavelet coefficients.

17. The method of claim 1, wherein obtaining the measurement of baseline values comprises obtaining a time series of the one or more combinations of the physiological, the cognitive, the psychosocial, and the behavioral parameter of the patient representing a craving level of the patient.

18. The method of claim 1, wherein obtaining a measurement of baseline values of the physiological, the cognitive, the psychosocial, and the behavioral parameter of the patient comprises obtaining a measurement of the patient's baseline values before or during applying an initial focused ultrasound signal, an initial deep brain stimulation signal, or an initial transcranial magnetic stimulation signal to a neural target site of the patient.

19. A method of notifying a patient or third party of a patient's addiction to an addictive behavior or addictive chemical substance in a patient comprising:
obtaining a measurement of baseline values of a physiological, a cognitive, a psychosocial, and a behavioral parameter of the patient;
applying an initial focused ultrasound signal, an initial deep brain stimulation signal, or an initial transcranial magnetic stimulation signal to a neural target site of the patient;
obtaining a subsequent measurement of resultant values of the the physiological, the cognitive, the psychosocial, and the behavioral parameter of the patient during or after application of the initial focused ultrasound signal, the initial deep brain stimulation signal, or the transcranial magnetic stimulation signal;
obtaining a comparison of the resultant values to the baseline values to determine if the patient's addiction has improved;
applying or adjusting application of one or more subsequent focused ultrasound signals, deep brain stimulation signals, or transcranial stimulation signals to the neural target site upon a determination that the patient's addiction has not improved; and
notifying the patient or third party upon the determination that the patient's addiction has not improved.

20. A method of monitoring addiction to an addictive behavior or addictive chemical substance in a patient comprising:
obtaining a measurement of baseline values of a physiological, a cognitive, a psychosocial, and a behavioral parameter of the patient; applying an initial focused ultrasound signal, an initial deep brain stimulation signal, or an initial transcranial magnetic stimulation signal to a neural target site of the patient;
obtaining a subsequent measurement of resultant values of the physiological, the cognitive, the psychosocial, and the behavioral parameter of the patient during or after application of the initial focused ultrasound signal, the initial deep brain stimulation signal, or the initial transcranial magnetic stimulation signal;
obtaining a comparison of the resultant values to the baseline values; and monitoring the patient's addiction based on the comparison of the resultant values to the baseline values.

* * * * *